Patented July 8, 1924.

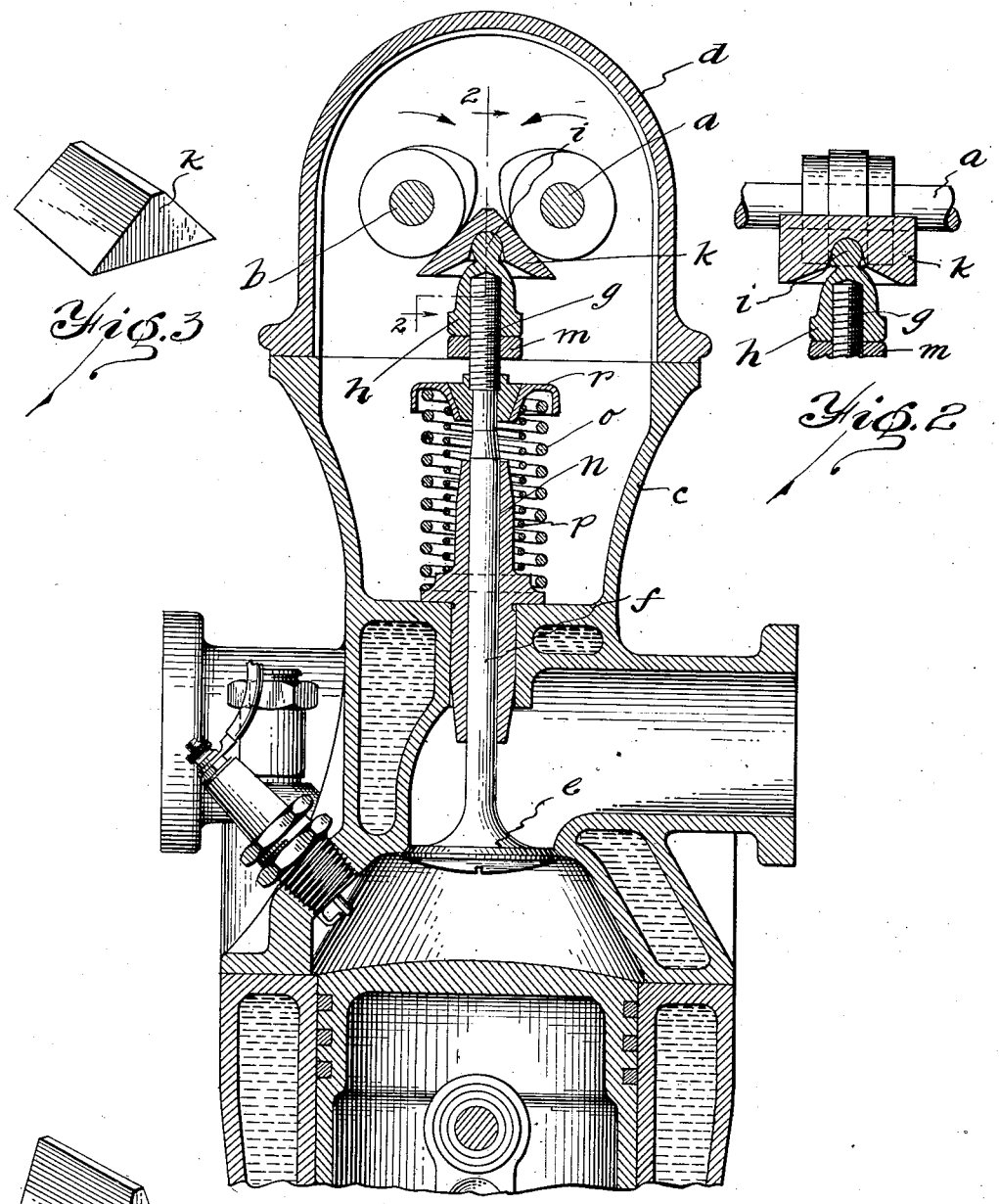

1,500,342

UNITED STATES PATENT OFFICE.

MILTON H. SMITH, OF DETROIT, MICHIGAN.

VALVE CONSTRUCTION.

Application filed October 29, 1923. Serial No. 671,332.

*To all whom it may concern:*

Be it known that I, MILTON H. SMITH, a citizen of the United States, residing at Detroit, in the county of Wayne and State of Michigan, have invented certain new and useful Improvements in Valve Constructions, of which the following is a specification.

This invention relates to valves and valve gear and especially valves intended for internal combustion engines. One of the greatest difficulties experienced in the smooth running of automobile engines is valve noise. This is more pronounced in the overhead type of valve than in the L or T head motor. In the overhead type of valve the noise is due to the large amount of exposed valve gear and the several points of clearance. It is also due in the both forms of motors to side thrust of the cams or rocker arms which communicate the movement to the tappets or push rods. This very often results in considerable wear in the valve stem guide or the tappet guide, resulting in looseness which furnishes a large amount of clicking and noise in the operation of the motor.

In my improved valve and valve gear construction, this is largely obviated. There is a further improvemennt in that the thrust member may be changed to alter the lift of the valve without in any way changing the length of the valve stem or without changing the cams. This will be more fully explained hereinafter.

In the drawings:

Fig. 1 is a vertical cross section through an internal combustion engine provided with overhead cam shafts and overhead valves.

Fig. 2 is a section taken on the line 2—2 of Fig. 1.

Fig. 3 is a detail in perspective of one of the thrust blocks.

Fig. 4 is a detail showing a thrust block having a different inclination of its surfaces.

No extended description of the various parts of the motor need be given; it will be apparent from the drawings the motor has the usual spark plug, piston, water cooling spaces, exhaust and intake, etc. A pair of overhead cam shafts $a$ and $b$ are enclosed in the extension of the engine casting, which forms the lower half $c$ of the valve housing. The upper half of the valve housing is secured to the lower half and comprises a removable cover $d$. The valve is designated $e$, and the valve stem $f$. The end of this stem is threaded as at $g$, and on this screws the acorn nut $h$ provided with a ball terminal $i$, over which loosely fits the thrust block $k$. This acorn nut may be locked in any adjusted position by means of the lock nut $m$. $n$ designates the valve stem guide which in the ordinary construction very often wears due to the side thrust. Compression springs $o$ and $p$ engage against the removable washer $r$ to normally set the valve on the valve seat.

In place of the ordinary rocker arm, tappet and push rod gear used on the top of the motor, I provide a valve gear housing formed by an extension of the engine casting that forms the lower half, and the removable cover member $d$ that forms the upper half. Within this valve housing two overhead cam shafts are driven at equal speed in opposite directions. The thrust block $k$, of triangular cross section, is placed loosely on the top of the ball terminal $i$. It is provided with a ball socket in which sets the ball. The two cam elevations are adapted to simultaneously ride down the slopes of this roof-like thrust member. The consequence is that the side thrust of one cam is neutralized by the side thrust of the other cam, and all the resultant thrust is in a straight line axially of the valve stem. This avoids all side thrust which often results in noise for it wears the valve guide and affords the objectionable clicking, as observed in so many otherwise smooth running motors.

Another very important factor in this improved construction resides in the interchangeability of the thrust blocks. By using such a thrust block as shown in Fig. 4, the lift of the valve may be lessened. If a greater lift of the valve is desired, then a thrust block of a less acute angle may be used. This will change the circumferential travel of the two cams to a larger longitudinal movement of the valve stem. This makes it very easy to change the opening of the valve without in any way altering the cam shaft. It is a very difficult thing to lay out and build a proper master cam shaft. In my construction, the manufacturer may easily alter the lift of his valve by simply changing the inclination on the thrust blocks. Furthermore, a variety of the thrust blocks offers an optional valve lift for the user of the car.

The construction that I have illustrated is not peculiar to overhead cam shafts. It will be obvious that the double oppositely running cams could be used equally well where the cams are located below the combustion chamber, and the motor is either an L head or T head type.

I have used the term "push member" in the claims so as to give a somewhat broader significance than would be given by the words "valve stem." A push member might be a tappet, a push rod or a valve stem.

What I claim is:

1. In a valve mechanism, the combination of a longitudinally guided valve and push member, and two separate actuating members engaging at opposite sides of the valve stem for thrusting the valve open, said members serving to neutralize the side thrust on the push member.

2. In a valve mechanism, the combination of a longitudinally guided valve and push member, a pair of oppositely rotating cams for thrusting the valve open and so located as to neutralize side thrust on the push member.

3. In a valve mechanism, the combination of a longitudinally guided valve and push member, and a pair of directly opposed rotating cams located on opposite sides at the end of the push member for thrusting the valve and push member, and neutralizing side thrust on the push member.

4. In a valve mechanism, a longitudinally guided valve and push member, a rockable thrust member on the end of the said member, and a pair of actuating members engaging the thrust members on opposite sides of the axis of the push member for opening the valve and neutralizing side thrust on the push member.

5. In a valve mechanism, the combination of a longitudinally guided valve and push member, a rockable thrust member located on the end of the push member, and a pair of oppositely rotating cams adapted to engage at opposite sides of the thrust member for thrusting the valve open and neutralizing the side thrust.

6. In a valve mechanism, a longitudinally guided valve and push member provided with a ball terminal, a rockable thrust member supported on the ball terminal, and a pair of actuating members located on opposite sides of the axis of the push member for engaging opposite sides of the thrust member to open the valve.

7. In a valve mechanism, a longitudinally guided valve and push member, an adjustable acorn nut secured on the end of the push member and provided with a ball terminal, a thrust member rockably supported on said acorn nut, a pair of actuating members contacting opposite sides of the thrust member and engaging on opposite sides of the axis of the push member for opening the valve.

8. In a valve mechanism, a longitudinally guided valve and push member, a thrust member provided with two oppositely inclined sides and engaging the end of the push member, and a pair of oppositely positioned, oppositely rotating cams engaging the two inclined sides of the thrust member.

9. In a valve mechanism, a longitudinally guided valve and push member provided with a ball terminal, a thrust member loosely fitting over the ball terminal and provided with oppositely inclined sides, and a pair of oppositely positioned and oppositely rotating cams for engaging the two inclined sides of the thrust member for opening the valve.

10. In a valve mechanism, the combination of a longitudinally guided valve and push member, a removable thrust member supported on the end of the push member by which the inclination of the sides of the thrust member may be altered by interchanging the individual thrust member, and a pair of actuating members for contacting the inclined sides of the thrust member, and which serve to lift the valve a varying distance depending upon the inclination of the sides of the individual thrust member used.

In testimony whereof he has affixed his signature.

MILTON H. SMITH.